United States Patent
Buldas et al.

(10) Patent No.: US 9,614,682 B2
(45) Date of Patent: Apr. 4, 2017

(54) SYSTEM AND METHOD FOR SEQUENTIAL DATA SIGNATURES

(71) Applicant: Guardtime IP Holdings, Ltd., Tortola (VG)

(72) Inventors: Ahto Buldas, Tallinn (EE); Risto Laanoja, Tallinn (EE); Ahto Truu, Tartu (EE)

(73) Assignee: GUARDTIME IP HOLDINGS, LTD., Tortola (VG)

( * ) Notice: Subject to any disclaimer, the term of this patent is extended or adjusted under 35 U.S.C. 154(b) by 0 days.

(21) Appl. No.: 14/684,336

(22) Filed: Apr. 11, 2015

(65) Prior Publication Data
US 2015/0295720 A1    Oct. 15, 2015

Related U.S. Application Data

(60) Provisional application No. 61/978,739, filed on Apr. 11, 2014, provisional application No. 62/023,970, filed on Jul. 14, 2014.

(51) Int. Cl.
*H04L 9/32* (2006.01)

(52) U.S. Cl.
CPC ............ *H04L 9/3247* (2013.01); *H04L 9/321* (2013.01); *H04L 9/3239* (2013.01); *H04L 9/3263* (2013.01); *H04L 9/3297* (2013.01); *H04L 2209/24* (2013.01); *H04L 2209/38* (2013.01); *H04L 2209/64* (2013.01); *H04L 2209/72* (2013.01)

(58) Field of Classification Search
CPC ........................................................ H04L 9/32
See application file for complete search history.

(56) References Cited

U.S. PATENT DOCUMENTS

| | | | | |
|---|---|---|---|---|
| 6,189,098 B1 * | 2/2001 | Kaliski, Jr. | ............ | G06F 21/33 713/168 |
| 6,912,680 B1 * | 6/2005 | Keeth | ................ | G11C 7/1051 713/401 |
| 7,698,557 B2 * | 4/2010 | Saarepera | ............ | H04L 9/3263 713/168 |
| 8,312,528 B2 * | 11/2012 | Saarepera | ............ | H04L 9/3263 713/156 |
| 8,347,372 B2 * | 1/2013 | Saarepera | ............ | H04L 9/3263 713/156 |

(Continued)

OTHER PUBLICATIONS

Haber et al., How to Time-Stamp a Digital Document, Journal of Cryptology, vol. 3, No. 2, pp. 99-111, 1991.*

(Continued)

*Primary Examiner* — William Powers
(74) *Attorney, Agent, or Firm* — Jeffrey Pearce

(57) ABSTRACT

A digital message is signed and, if a request is approved, receives a time stamp. The request is computed as a first function of the message and a current one of a sequence of passwords computed such that each password corresponds to an index unit. Each of the passwords may be computed as a function, such as a hash function, pseudo-random function, or encryption function, of the subsequent password, whereby the sequence terminates with an initial password that forms a public key parameter for the password sequence. At least one hash tree uses at least a subset of the passwords as inputs to a hash tree used to verify the passwords.

39 Claims, 6 Drawing Sheets

(56) References Cited

U.S. PATENT DOCUMENTS

| | | | | |
|---|---|---|---|---|
| 2002/0184504 A1* | 12/2002 | Hughes | ............... | H04L 9/3236 |
| | | | | 713/177 |
| 2011/0264917 A1* | 10/2011 | Barthelemy | .......... | H04L 9/3255 |
| | | | | 713/176 |
| 2016/0182486 A1* | 6/2016 | Wu | .................... | G06F 21/6209 |
| | | | | 726/28 |

OTHER PUBLICATIONS

Buldas et al., Optimally Tight Security Proofs for Hash-Then-Publish Time Stamping, R. Steinfeld and P. Hawkes (Eds.): ACISP 2010, LNCS 6168, pp. 318-335, 2010.*

* cited by examiner

SYSTEM AND METHOD FOR SEQUENTIAL DATA SIGNATURES

CROSS-REFERENCE TO RELATED APPLICATIONS

This application claims priority of both U.S. Provisional Patent Application No. 61/978,739, filed 11 Apr. 2014, and U.S. Provisional Patent Application No. 62/023,970, filed 14 Jul. 2014, both of which are incorporated here by reference.

FIELD OF THE INVENTION

This invention relates to a system and method that provides digital signatures for data sets.

BACKGROUND

Keys are the most vulnerable components of conventional digital signature solutions. Key exposure is dangerous not only to the key owner but also to the parties that rely on digital signatures as potential evidence to protect their rights. The validity (integrity) of digital signatures that use traditional public key-based mechanisms depends on assumptions that some private keys are secure. On one hand, instant revocation of keys is necessary to protect the signer. On the other hand, the possibility of instant revocation makes the signature verification procedure complex, because one has to prove that the key was not revoked at the time of creating the signature. Additional confirmations such as Online Certificate Status Protocol (OCSP) responses, time-stamps, etc., must therefore typically be added to the signature.

If instant revocation is possible, the signature key can be revoked immediately after signing; hence, verification mechanisms must be very precise in determining the chronological order of the signing and revocation events. Due to the evidentiary function of signatures, this order may also need to be provable to third parties long after the document has been signed. The public-key time-stamping solutions such as the one proposed in RFC3161 do not eliminate this problem because the validity of time-stamps also depends on the validity of (some) keys.

Traditional electronic signature schemes, such as public-key systems like RSA, are also vulnerable to quantum-computational attacks. Quantum attacks are becoming more and more practical and it is therefore reasonable to take them into account when designing long-term solutions for digital signatures.

In light of these two considerations (secret-independent integrity and quantum immunity), so-called hash function-based digital signatures are becoming increasingly important. The history of such signature schemes goes back to early 1980's—hash function-based signatures were first studied by Lamport in 1979 and Merkle in 1980.

Lamport one-time signatures were designed for signing a message bit-wise: for each bit of the message, two secret random numbers $r_0$ and $r_1$ are chosen and their one-way images $f(r_0)$ and $f(r_1)$ published as the public key. For signing the corresponding bit $b \in \{0, 1\}$ of the message, the random number $r_b$ is revealed and the other number $r_{1-b}$ is destroyed. The key pair $f(r_0)$ and $f(r_1)$ can be used only once and must be immediately revoked after the use. The signature can be made more efficient if the message is hashed before signing and the bits of the hash are signed. Merkle proposed the use of hash trees for more efficient publishing and verifying the public keys of the Lamport signature.

In 1981, Haber and Stornetta showed how to use hash functions for time-stamping such that the validity of the time-stamps does not depend on any secrecy assumptions, thereby providing the Lamport scheme with a key-independent revocation check mechanism. It has been proven (by Buldas and Saarepera in 2004, and more efficiently by Buldas and Niitsoo in 2010) that such hash function-based time-stamps cannot be back-dated if the hash function used is collision-resistant.

DETAILED DESCRIPTION

Figure 1:
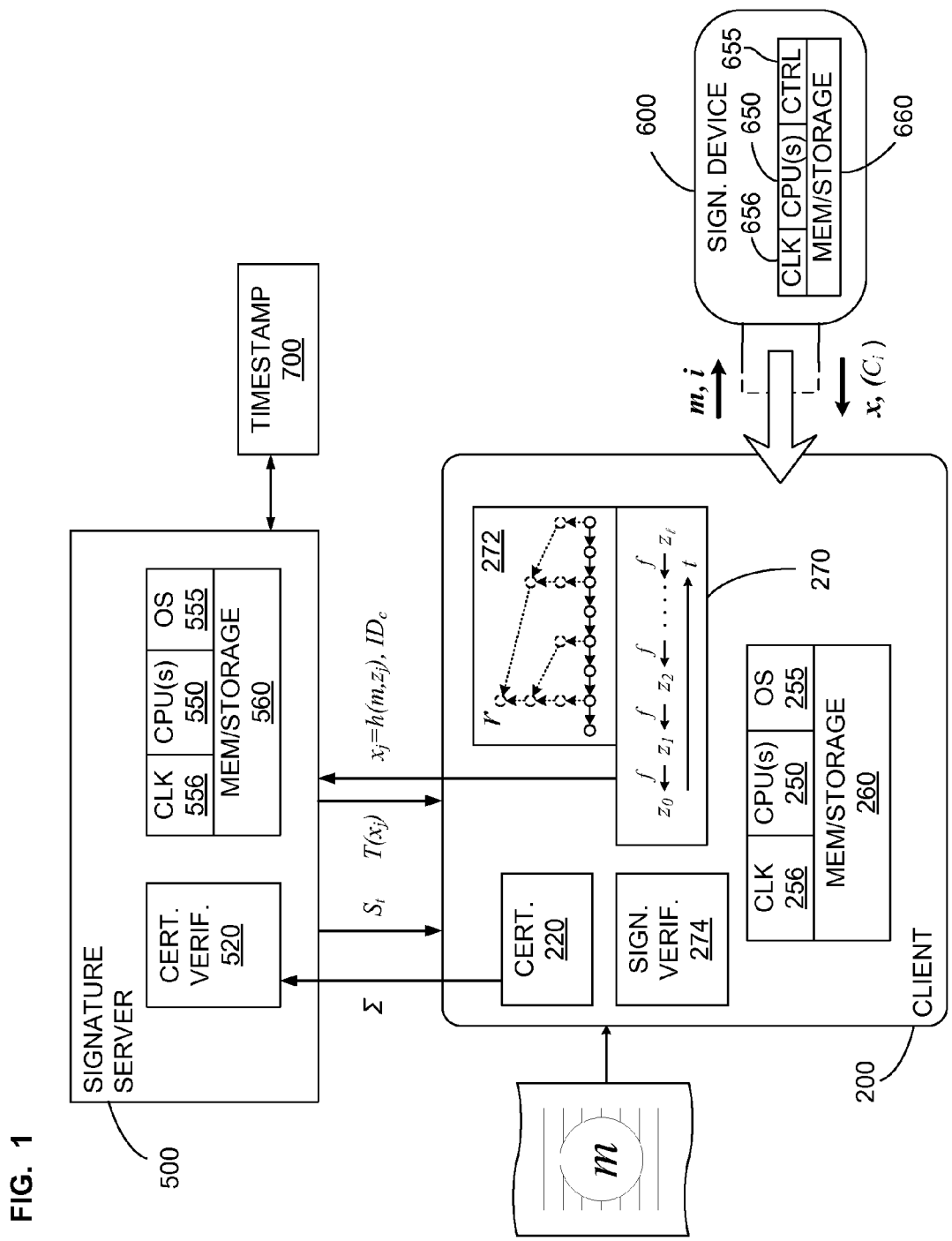
FIG. 1 illustrates a system for generating digital signatures.

For ease of comparison, various aspects of the invention are described below in conjunction with further discussion of existing systems. One aspect is the use of server-based signatures, where signatures are created with assistance of at least one signature server 500 (see FIG. 1) which may (but need not) be configured as third parties that, on request by at least one client 200, create signatures in the name of clients. In using a signature server, a preferably (but not necessarily) publicly available server participates in the electronic signature creation process, since this allows for a reliable publication process.

In contrast, prior art solutions based on public-key cryptography assume that users may sign their documents off-line, without any communication with servers. For many reasons, server-based signatures are preferable. For example, they can reduce the computational cost of creating digital signatures, and make it easier to detect possible abuses of signature keys.

Many different forms of server-based signatures exist. For example, Lamport signatures are server based, as are the so-called on-line/off-line signatures first proposed in 1989 by Even, Goldreich and Micali (and in 2008 generalized by Catalano, di Raimondo, Fiore and Gennaro) in order to speed up the signature-creation procedure, which is usually much more time-consuming than verification. So-called Server-Supported Signatures (SSS) proposed by Asokan, Tsudik and Waidner in 1997 delegate the use of time-consuming operations of asymmetric cryptography from clients (ordinary users) to a server, whereby clients use hash sequence authentication to send their messages to a signature server in an authenticated way and the server then creates a digital signature by using an ordinary public-key digital signature scheme. In SSS, signature servers are not considered Trusted Third Parties because the transcript of the hash sequence authentication phase can be used as evidence. In SSS, servers cannot create signatures in the name of their clients. The so-called Delegation Servers (DS) proposed in 2002 by Perrin, Burns, Moreh and Olkin reduce the problems and costs related to individual private keys. In their solution, clients (ordinary users) delegate their private cryptographic operations to Delegation Servers that, after authenticating the clients, sign messages on their behalf.

To understand the improvements provided by different aspects and embodiments of the invention, it is helpful to understand in a bit more detail some of the features and shortcomings of traditional signature solutions.

Traditional Signature Solutions

In a traditional signature system, each user has a private key d, and a public key e that is made available to all potential verifiers. To sign a message m, which may be any defined body of digital information, the signer computes the signature a as the result of applying a signature function S(d; m). To verify a digital signature, one applies a verification function V(e; m; σ), which indicates verification if and only if the signature is correct.

These prior art systems require some way to distribute the public keys that is assumed to be reliable—this is typically a trusted Certification Authority (CA). The CA also has a private key that is used to sign public key certificates, which are statements that bind public keys to the identities of users. The certificate is usually added to the signature for reliable verification of the key-identity relationship.

These traditional solutions also foresee that users may need to revoke their keys (certificates), for example, in case the keys are suspected of being compromised. They therefore typically also need time stamps in order to prove that the signature was created before the key was revoked. Conventional PKI signature schemes rely on a trusted Time Stamping Authority (TSA) for this purpose. Time-stamping is a mechanism to prove that certain data was created at (or before) a certain time—in the context of signatures it helps to determine whether the key was valid (not revoked) at the time of creation of the signature. In PKI, the time-stamping service is usually provided by third parties who are assumed to be trustworthy and who simply sign a hash of the data (sent by a client) together with current time reading.

In practice, PKI-based signature solutions typically require even more trusted parties: Usually there are also the so-called On-line Certificate Status Protocol (OCSP) responders, whose duty is to confirm the validity of public key certificates. The OCSP-responders in turn also use private keys to sign the validity statements; moreover, the OCSP responses must be reliably dated. In essence, using these schemes, even if a user were not to trust the integrity of the keys, he would then still have to trust the authority that issued the underlying certificate—the requirement for trust remains, but just at a different level.

Due to the complicated structure of trusted third parties that are necessary in the traditional signature solutions, the structure of a signature is complicated, comprising the signature itself, the certificate, the time-stamp of the signature, the OCSP-response, etc. Still, in spite of its complexity, PKI signatures fail to provide a complete answer to the fundamental question of what happens if the keys of the trusted third parties become compromised. One must therefore add another layer of time-stamps, OCSP-responses, etc., that are signed by higher-level trusted third parties, and so on. Such traditional, PKI-based signature solutions therefore suffer from a kind of "chicken and egg" problem. There are, moreover, other fundamental threats for traditional digital signatures, such as the fast-developing field of quantum computation.

Quantum Computing

Quantum computing was envisioned in early 1980's by Manin and Feynman. In 1997, Shor presented the first quantum algorithm for factoring integers, which means that if a practical quantum computer can be built, many traditional cryptographic signing algorithms like RSA will become totally insecure. Hash functions, however, appear to be able to remain secure even in the presence of functional quantum computers. In 1996 and 2001 Grover presented quantum algorithms for searching a record from an N-element unsorted database in time $O(N^{1/2})$. In 1998, Brassard, Høyer and Tapp presented an efficient collision-search algorithm, which they claimed is capable of finding collisions for n-bit hash functions in time $2^{n/3}$, whereas, in ordinary computers, it would take $2^{n/2}$ steps. In practice, this would simply mean that one should use about 1.5 times larger hash functions. In 2009, Bernstein called their practical implication into question such that, for now, collision search on ordinary computers is at least as fast as it would be in quantum computers, which means that hash functions seem to be quantum-immune.

In sum, traditional electronic signatures use trapdoor one-way functions, such as RSA, and they will be insecure if and when quantum computers become a practical reality. Despite the discussion here of the advantage of quantum immunity, this is not a requirement for any of the embodiments of the invention, although it is of course a "side-benefit" of the use of hash chains and hash trees whose importance may grow with time.

Hash-Tree Digital Signature Schemes

Hash functions therefore seem to remain secure; accordingly, there already exist signature schemes that are based entirely on hash functions. The first such scheme was proposed in 1979 by Lamport. The Lamport signature scheme is, however, inefficient because of its signature size (a few hundred hash values) and the public key size (two hash values for every signed bit). In 1980, Merkle proposed using hash-trees to efficiently publish a large public key. The Lamport signature scheme and its more efficient modification by Merkle have a fundamental weakness inherent in secret keys—the secrecy of keys is still a necessary assumption not only for the security of signing but also for the security of verification. If the key is compromised, all signatures become unreliable. So, the revocation problem still affects Lamport-Merkle-type solutions.

Data Signatures Using Merkle Trees

A data signature is a mechanism to protect the integrity of data, that is, to prevent or at least detect unauthorized modification of data. A hashing and publishing mechanism may be used for that purpose: Data is hashed using public and standard cryptographic one-way hash functions and the hash is then published in some widely witnessed way such as in a newspaper, etc. Such a signature infrastructure is disclosed in U.S. Pat. No. 8,719,576 (Buldas, et al., "Document verification with distributed calendar infrastructure") ("Buldas '576").

Figure 2:
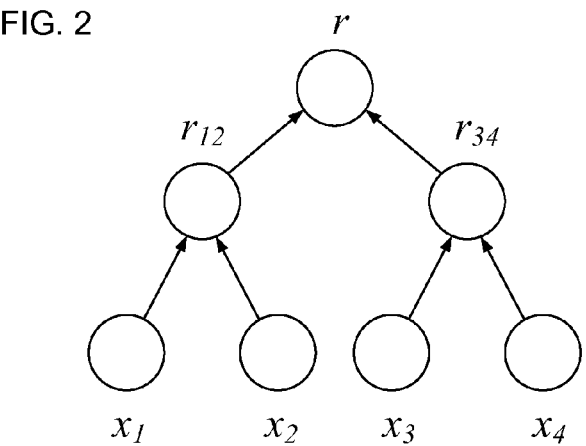
FIG. 2 illustrates a Merkle hash tree.

In the figures, circles represent computation of a hash function, that is, "leaves" of a hash tree or nodes in a hash sequence, with in-arrow(s) indicating the input parameter(s) of immediately subordinate "child(ren)" being hashed together and the out-arrows indicating the hash value output. See FIG. 2. Many hashes may be combined and published together by using a Merkle hash tree. The lowermost leaves of the tree, representing hashes of respective data records (x1; ...; x4) are paired and hashed repeatedly "upward" to compute a root hash r of the tree.

A data signature (of a data record) is a proof that the data record took part in creating the global hash tree (for a certain time unit). The later proof is a "path" through the global tree (a hash chain) that consists of the data that is necessary to re-compute the root of the global hash tree. For example, the path for x1 in FIG. 2 consists of $x_2$ (for re-computing $r_{12}$) and $r_{34}$ (for re-computing r from $r_{12}$), as well as any other configured parameters such as order, etc. Such data signatures are compact, because in the case of N leaves, their size is only O(log N). Such a hash-tree scheme has been proven to be secure against back-dating attacks, assuming collision-freeness and other security properties of hash functions. Note that, in this disclosure, the logarithm function "log", unless otherwise indicated, is assumed to be the binary logarithm, that is, the logarithm to the base 2.

Hash Calendar

Figure 3A:
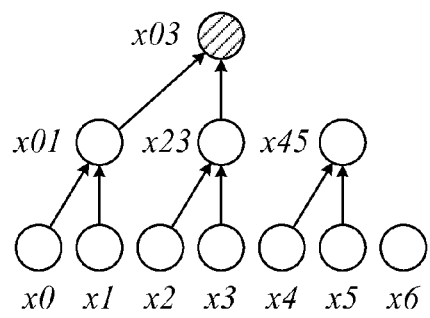
FIG. 3A illustrates a hash calendar at a time 6.

A hash calendar, as disclosed in Buldas '576 is a special kind of hash tree. At any given moment, the tree contains a leaf node for each second (or other chosen calendar period) since some pre-determined initial time, such as 1970-01-01 00:00:00 UTC. The leaves may, for example, be numbered left to right starting from zero and new leaves are always (every second, or other chosen calendar period) added to the right (FIG. 3A). The internal nodes of the tree can be computed only if the corresponding predecessor nodes have been computed. For example, at time 6, FIG. 3A shows three sub-trees computed: one for the leaves $x_0$-$x_3$, one for leaves $x_4$-$x_5$ and a singleton tree for $x_6$. Note that, in FIGS. 3A-3C, the notation $x_{jk}$ indicates a node that represents the repeated pair-wise hashing of "leaf" nodes $x_j$-$x_k$.

Figure 3B:
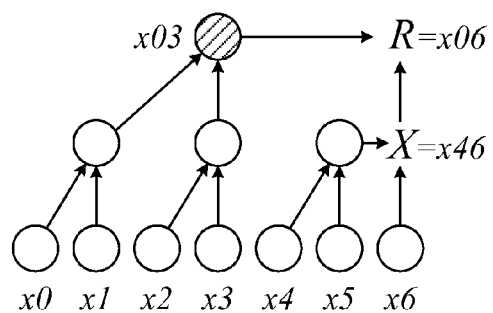
FIG. 3B illustrates the computation of a publication.

See FIG. 3B. To compute the published hash value at time 6 (assume by way of example this is the publishing time), first a temporary hash value x=($x_{45}$; $x_6$) is computed, where $x_{45}$ is the root of the tree with leaves $x_4$, $x_5$, and $x_6$ is the 6th leaf, and finally the published hash R is computed as R=h($x_{03}$; x), where $x_{03}$ is the root hash of the tree with leaves $x_0$, $x_1$, $x_2$, $x_3$.

Figure 3C:
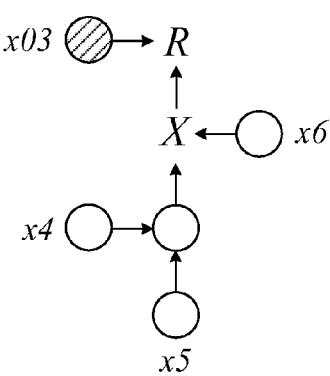
FIG. 3C illustrates a calendar hash chain at a time 5.

FIG. 3C illustrates the calendar hash chain for the $5^{th}$ leaf, which has a right link as the first link with sibling hash $x_4$, a left link structure with sibling hash $x_6$ as the second link, and right link structure with sibling $x_{03}$ as the third and final link.

Since the calendar tree is built in a deterministic manner, the shape of the tree for any moment can be reconstructed knowing just the number of leaf nodes in the tree at that moment, which is one more than the number of seconds (or other chosen periods) from the beginning of the calendar (1970-01-01 00:00:00 UTC in our example) to that moment. Therefore, given the time when the calendar tree was created and a hash chain extracted from it, the time period that corresponds to the leaf node is uniquely determined.

Hash Calendar "in Action"

A publicly available hash calendar can be used as an audit mechanism in order to prevent malicious behavior of the server. Real-world publishing mechanisms are usually not efficient enough to publish every hash in the calendar immediately after creation, so during the time period between creating a calendar hash and publishing it the server may try to reorder the calendar hash values. To prevent that from happening, the signing server therefore preferably replies promptly after creating a new calendar hash so that the reply contains a unique representation of the whole previous calendar. For example, when creating x6 (FIG. 3C), the server has to reply with two root hash values: the root of the subtree with leaves $x_0$; $x_1$; $x_2$; $x_3$ and the and the sub-tree with the leaves $x_4$; $x_5$. If the server still tries to reorder the calendar hash values, then it has to reply inconsistently to the clients, which will be detected sooner or later.

BLT Signatures

Disclosed here are different embodiments of a new type of hash function-based signature scheme in which the signature process involves a signature server 500 (FIG. 1). For simplicity, this scheme is referred to below as the "BLT" solution, the "BLT" signature scheme, or simply "BLT", after the initials of the inventors.

In one embodiment, for every time unit t, the client 200 has a one-time, pseudo-random password $z_t$, and the passwords are computed as a sequence C(z) using the relationship $z_t = f(z_{t+1})$, where $f$ is a one-way (hash) function. As used herein, a function $f$ is said to be "one-way" if, given an output $f(x)$ of a randomly chosen input x, it is hard to find $x_0$ such that $f(x_0)=f(x)$. In the following, additionally, a somewhat non-standard one-wayness concept is adopted: if $f$ and h are functions with equal domains, then h is said to be $f$-one-way if, given an output h(x) of a randomly chosen input x, it is hard to find $f(x)$.

The last element $z_0$ of the one-way sequence C(z)

$$z_0 \xleftarrow{f} z_1 \xleftarrow{f} z_2 \xleftarrow{f} \cdots \xleftarrow{f} z_t$$

is the public key of the signer. To sign a message m at time t, the signer: (1) combines m with a one-time password $z_t$ that is dedicated for signing messages at time t; and (2) sends a hash x=H(m, $z_t$) to the server to obtain a time-stamp $T_t(x)$ for x. The signature (x, $z_t$, $T_t(x)$) is considered valid only if t=t' and $z_t$ is verified to be the t-th element of the sequence. This can be done by iterating $f$ (exactly t times) on $z_t$ and comparing the result with $z_0$ (the public key).

A "message" may be any set of digital information (1's and 0's) that is, or can be formatted or otherwise transformed to be, in a form suitable as an input to the chosen hash function. The client, that is, the software module(s) within the client that process the message according to any embodiment of this invention, may "receive" the message from an external hardware or software entity, or from a hardware or software entity or process within the client itself.

The server 500 may determine the time-stamp in any known way, such as internally within the signature server 500 according to an internal clock 556. It may, however, alternatively request a time-stamp from an external system 700. One advantageous example of such a system is the distributed, hash tree-based Guardtime signature infrastructure described in more detail below.

For signing messages during the next time unit (t+1), the pre-image $z_{t+1}$ of $z_t$ must be found and released. As the hash function cannot be inverted, the only way to do this, however, is to compute $z_{t+1}$ from the previously saved hash values $z_j$ with j>t+1 (the so-called "pebbles", as defined below).

There needs to be some way to efficiently and gradually release the pre-images of the one-time passwords. Some methods involve using hardware devices. Secure memory is, however, a relatively costly resource in hardware devices such that even a slight decrease in memory consumption is valuable. Trivial solutions are (1) to store the whole sequence C(z) (that is, use O(l) memory) and hence make the traversal possible in O(1)-time; or (2) to store only $z_t$ (that is, use O(1) memory) and compute the next password in O(l) time. The best traversal algorithms by Jakobsson (2002), and Coppersmith and Jakobsson (2003) and Schoenmakers (2014) require (log l) memory and (log l) traversal steps.

Note, however, that "pebbling" solutions such as those described by Jakobsson, Schoenmakers and others are efficient only if the signature device is constantly up and running, which is not usually the case for devices such as the smart-cards that are often used as personal digital signature devices. (Other embodiments are described that deal with this problem.)

Proposed here and discussed below is therefore also an embodiment of the BLT scheme for devices that have no power supply and are not regularly connected to computers. Many such devices, such as general-purpose cryptographic smart cards, also have many restrictions that limit the use of hash sequence signatures. For example, their hashing speed is typically relatively low, only up to about 500 hashing steps per second; moreover, their secure memory is of limited size, etc. This, combined with possibly irregular usage patterns, may render the usefulness of hash sequence-based signatures questionable. This invention therefore provides embodiments with a type of hash sequence signature that is more suitable for such a purpose.

Server-Based Signatures and Non-Repudiation

BLT-type signatures are server-based, that is, a (preferably publicly available) server participates in the electronic signature creation process, since this provides a reliable publication process. In contrast, prior art solutions based on public-key cryptography assume that users may sign their documents off-line, without any communication with servers. For many reasons, server-based signatures are preferable. For example, they can reduce the computational cost of creating digital signatures, and make it easier to detect possible abuses of signature keys.

One commonly desired property of digital signatures is non-repudiation, that is, the potential ability to use the signature as evidence against the signer. Solutions in which trusted third parties are (technically) able to sign on behalf of their client are not desirable for non-repudiation because clients may use that argument to (fraudulently) call their signatures into question. Therefore, solutions that presume clients having their personal signature devices, or some other hardware or software mechanism that is uniquely associated with clients, are preferable to those relying entirely on trusted parties.

One-Time Hash-Password Schemes

As mentioned above, the main idea behind iterated hash sequence authentication (first proposed by Lamport in 1981) is that the client first generates a sequence of hash values (with reverse order of indices). Let t be the number of possible authentication sessions (that is, the number of one-time passwords). Then $z_t$ is a random seed, and $z_i \leftarrow f(z_{i+1})$ for all i<l. The last element $z_0 = f(z_1)$ in the sequence is the so-called public key, which is published and also given to the server. Now, the client will use $z_1$ in the first authentication session. The server does not know $z_1$ before the client uses it, but as it knows $z_0$ (the public key) it is possible to verify the password by checking the relation $z_0 = f(z_1)$. After the first session, the server already knows $z_1$ and hence it is possible for the server to check $z_2$ used by the client (by the relationship $z_1 = f(z_2)$), etc.

Time-Dedicated Passwords

The indices i may also be related to time, that is, $z_i$ may be assumed to be published by the client not before time $t_0+i$, where $t_0$ is a certain initial time that is also published together with the public key $z_0$. If now, for example, a message m and a $z_i$ are time-stamped together, this may be considered as a signature of m. The signature is correct only if the date of the time stamp is not later than $t_0+i$. The signature cannot be forged because all published passwords $z_1, z_2, z_i$ are useless for creating signatures after $t_0+i$ as no suitable time-stamps can be obtained any more (at least if the time-stamps are not back-dated by the time-stamping authority).

In the context of authentication, this idea was first used in the so-called TESLA protocol in Perring, Canetti, Tygar and Song in 2002. However, as described by the authors of TESLA, the scheme is not suitable for digital signatures because of inefficiency of off-line verification—TESLA was designed to authenticate parties who are constantly communicating with each other. This is typically not the case for digital signatures, however, but even if one were to convert TESLA to autonomous digital signatures, their size would grow to O(l).

Efficiently Verifiable Hash Sequences

For some applications, especially for signatures, it should be possible to verify whether the one-time password $z_i$ that was just used is indeed the i-th element of the sequence. One way to do it is to iterate $z_i$ exactly i times and compare the result with the public key $z_0$. For long hash sequences, however, this may take a lot of time. Therefore, an additional hash-tree structure may be used to speed up the process. Let $r = \mathcal{T}^h(z_1, \ldots, z_l)$ be the root hash of a hash tree $\mathcal{T}^h$, created with a hash function h. The public key is then a pair $(z_0, r)$. If the one-time password $z_i$ is used, a hash chain from $z_i$ to r can be presented to show that $z_i$ is in the right place of the sequence. The proof is of size (log l), and one only needs (log l) steps (instead of (l)) to verify it.

Figure 4A:
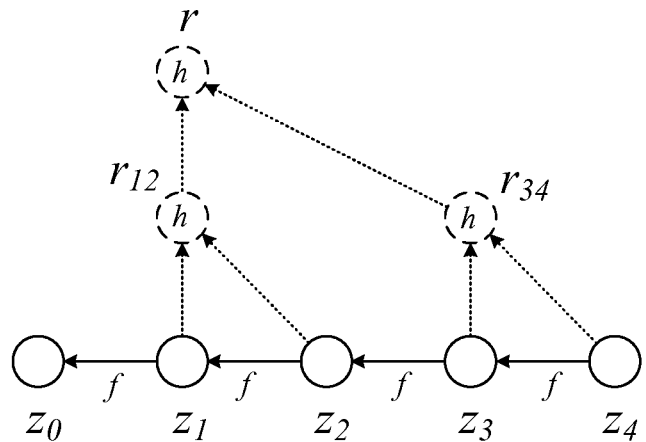
FIGS. 4A and 4B illustrate, respectively, a key hash sequence in a standard Merkle tree arrangement and in a secure variant according to one aspect of the invention, respectively.

See FIG. 4A, which illustrates a hash sequence with an additional hash tree structure (dashed). The computational nodes (circles) for this additional hash tree structure contain the letter "h" to indicate that it may apply a different hash function (h( )) than the one (f( )) used to compute $z_i \leftarrow f(z_{i+1})$. The function h is preferably f-one way to avoid premature disclosure of one-way passwords—If the tree and the sequence were computed with the same one-way hash function, then the hash chain for $z_1$ would contain $z_2$ and hence $z_2$ would be prematurely disclosed.

Figure 4B:
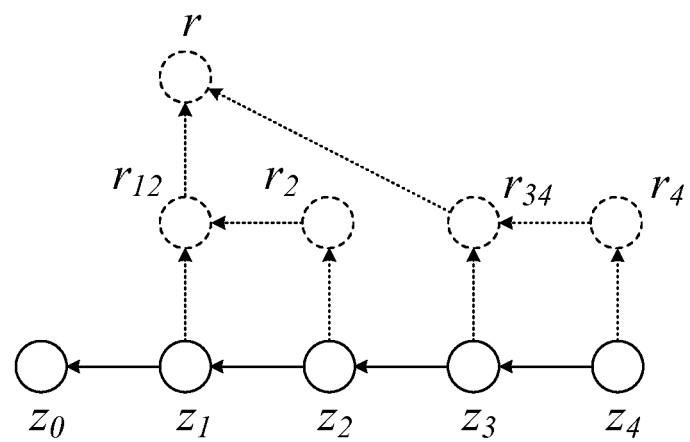

FIG. 4B illustrates an extension of the hash tree structure shown in FIG. 4A that overcomes the need to use two different hash functions to avoid premature disclosure of "future" hash values. Rather than including $z_2$ "raw" in the hash chain for $z_1$, for example, a hash of $z_2$ is, and only this hash is published in the hash chain for $Z_1$. In other words, in this embodiment, $r_{12} = f(z_1, r_2) = f(z_1, f(z_2))$. Because of the essentially insurmountable difficulty of inverting the hash function f( ) at the stage when $z_1$ is disclosed, it will not be possible to determine $z_2$; at the stage when $z_3$ is disclosed, it will not be possible to determine $z_4$; etc.

Figure 4C:
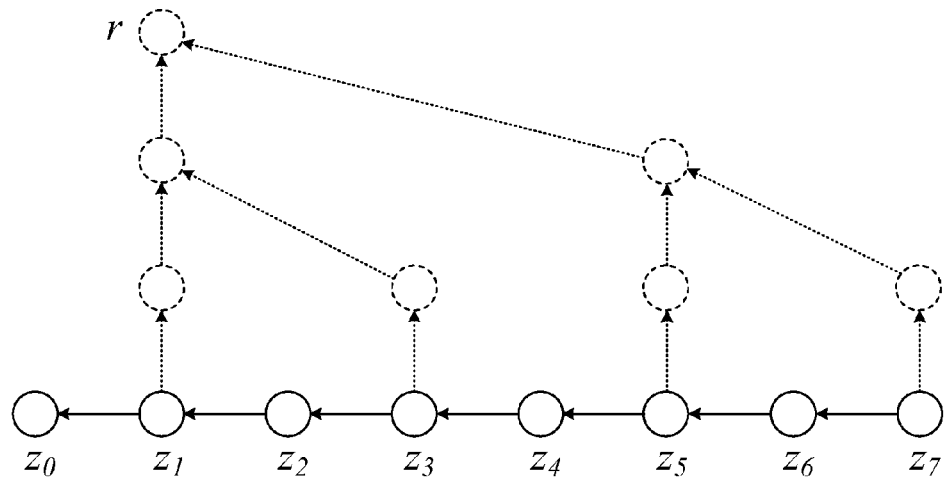
FIG. 4C illustrates a reduced hash tree allowing verification of a subset of a sequence of passwords generated using an iterative hash computation scheme.

FIG. 4C shows the computational arrangement of FIG. 4B for eight passwords $z_0$-$z_7$. Compared with the configuration in FIG. 4B, the additional hash tree in the configuration of FIG. 4C is relatively sparser, inasmuch as only every other password is hashed "upwards" into the hash tree to form the r value. In FIG. 4C, only the odd-numbered passwords are hashed and then these hash values are in turn hashed pairwise and repeatedly upward to form the current r value. In this sparser configuration, the passwords that aren't hashed into the verification tree (the tree "above" the password sequence) may still be used, but be confirmed using single backwards hashing ($z_i \leftarrow f(z_{i+1})$). It would even be possible to make the hash tree even sparser by "skipping" more passwords, for example, by hashing only every third, or fourth, etc., password node into the verification tree, using the backwards "count" of hash computations to confirm the validity of a "non-tree" password backwards to the preceding password node that is hashed into the verification tree. The more password nodes that are used in the tree to form each current r value, the greater will be the computational efficiency, but at the cost of a larger data structure to maintain.

In the following, the basic procedures of the BLT signature scheme are explained, as well as some additional procedures related to secure client-side implementations of the BLT solution.

Key Generation

As FIG. 1 illustrates, the client, for example using a software module 270, generates a random seed $z_l$ and a key-hash sequence $C(z)=z_1, z_2, \ldots, z_l$ by using the relationship $z_{i-1}=f(z_i)$ (for all i=1 . . . 1). Every $z_i$ is a one-time password for a particular time. The client also computes, for example, in a software module 272, the key hash-tree (FIG. 4A) and its root hash r. In this embodiment, the client's public key consists of $z_0=f(z_1)$ and r.

Public Key Certificates

A public key certificate Σ for a client 200 (FIG. 1) may, for example, be a 5-tuple $\Sigma=\langle ID_c, z_0, r, t_0, ID_s\rangle$, where $ID_c$ is an identifier of the client, $(z_0, r)$ is the public key, $t_0$ is the time when the certificate becomes valid (that is, $z_1$ is intended to sign documents at time $t_0+1$, $z_2$ is for signing at $t_0+2$, etc.), and $ID_s$ is an identifier of the signature server 500 that is authorized to serve the client. Note that the identity parameters are not necessary, but have the advantage of clearly tying a request to a given client and signature server, which allows revocation of the client certificate by disabling particular clients' access to designated signature server $ID_s$. The certificate is compiled and sent, for example, by a certificate software module 220, to the signature server 500, in particular, to a software module 520 configured to receive and verify it, and may also be published in a way that is not controlled by the signature server so that the server cannot create or change clients' certificates without easy detection. To revoke the certificate, the client or other authorized party may send the server a revocation note, after which the server denies access to this particular client.

Signing a Document

To sign a document/message m (or a hash of a message) at time $t>t_0$ (where $t=t_0+i$), the client computes $x=h(m, z_i)$ and sends x together with its identity $ID_c$ as a request to the signature server 500. The server, for example in the module 520, checks that the certificate of the client has not been revoked (no revocation note has been received) and, if not, creates a hash-tree time-stamp $S_t$ for the pair $(x, ID_c)$, and sends $S_t$ back to the client. The signature for m is then $\langle ID_c, i, z_i, C_i, S_t\rangle$, where $C_i=C(z_i)$ is the hash chain which proves that $z_i$ is the i-th element of the key-hash sequence. Note that it would be possible to sign more than one message m in the same time period, using the same password—using the preferred signature scheme, the respective signatures will still be unique.

Verifying a Signature:

To verify the signature $\langle ID_c, i, z_i, C_i, S_t\rangle$ on the message m with the certificate $\langle ID_c, z_0, r, t_0, ID_s\rangle$, for example, in a verification module 274, checks the following:

Client identities in the certificate and in the signature coincide.

The key $z_i$ and the hash chain $C_i$ lead to the root hash value r, or that $f$, iterated on $z_i$ exactly i times, leads to $z_0$.

$S_t$ is a valid time-stamp on $(h(m, z_i), ID_c)$

Time t extracted from $S_t$ satisfies $t=t_0+i$, that is, the correct key was used.

Server identities in $S_t$ and the certificate coincide, that is, the server was authorized by the client to create the signature.

Note that the verifying entity may (but need not) be different from the entity that originally requested the signature.

Security

The security of the signature scheme benefits from the fact that if $z_i$ is used right before $t_0+i$ (when $z_i$ expires), then it is impossible to abuse $z_i$. If $z_i$ is used too early (sufficiently long before $t_0+i$), then $z_i$ can be abused by anyone who has the signature with $z_i$. So, for the security of the scheme, the signer preferably verifies the signature before disclosing it to other parties. This guarantees, due to the condition $t=t_0+i$, that $z_i$ is safe to disclose. Note that this is a significant advantage relative to prior art schemes that use hash chaining: In prior art systems, knowing the current and, possibly, past values of the hash sequence is sufficient to defeat the security of the system, or at best to make it dependent on trust of the signature server. In contrast, to defeat the security of embodiments of this invention, one would also have to correctly predict the next password $z_{i+1}$ as well. This would be equivalent of being able to determine $f^{-1}(z_i)$, which, given the known nature of cryptographic hash functions and currently available computational power and known algorithms, is practically impossible, even for an attacker with a hypothetical quantum computer at his disposal. In other words, prior art solutions can be defeated by knowing the present and past, but the embodiments of this invention would also require knowing the future. Signatures are considered valid only if $t=t_0+i$, where t is the time indicated by the data signature (time-stamp) St obtained from the service.

In practical implementations, the value of t in St depends on the service delay. Hence, t may vary but the values $t_0$ and i are fixed before sending the signature request to the server. Therefore, the equality $t=t_0+i$ does not necessarily hold. The service can be organized so that the delay is predictable, however, and is no more than a few seconds. The client may then send several requests in parallel using i, i+1, i+2, i+Δ, where Δ is the maximum accepted service delay. Hence, there is always i'ε[0, . . . , Δ] for which $t=t_0+i'$. The client keeps the signature with such i' and deletes the rest.

Hash Calendar Traversal

As mentioned above, Jakobsson, Schoenmakers and others have proposed "pebbling" methods to enable more efficient traversal of hash sequences. In simple terms, a few elements in a sequence are marked as "pebbles"; their values are stored, and these pebbles can then be used as "intermediate" starting points. In other words, instead of having to compute a sequence all the way from the initial value, one needs to compute only from the nearest pebble. This reduces the computational burden, but at the cost of needing to store the pebble values. For example, if N static pebbles are evenly distributed (and stored), then, in the worst case, O(l/N) hash calculations will be needed per key.

Embodiments of this invention may modify a pebbling arrangement for hash sequence traversal (such as in Jakobsson) for use in hash calendar traversal in which, in addition to consecutively revealing pre-images, the hash chains that prove to the global root are also revealed. By suitably placing the pebbles, the preimage computation time in a hash sequence can be reduced from (l) to (log l). While, in the original algorithm of Jakobsson, a pebble consists of one hash value, in this modified arrangement a hash chain to the global root hash (comprising of O(log l) hash values) is added. With log l) pebbles, the memory requirement will be $\log^2 l)$. Note that pebbles need not remain in static positions. For example, a pebble can be moved to the left (viewed as in FIGS. 4A, 4B, 4C, and 5), whereupon a new hash chain is created for the moved pebble. It can be shown that this can be done with O(log l) hash computations per move. Hence, each traversing step will require $O(\log^2 l)$ hash steps, which holds for hash trees of any shape.

Figure 5:
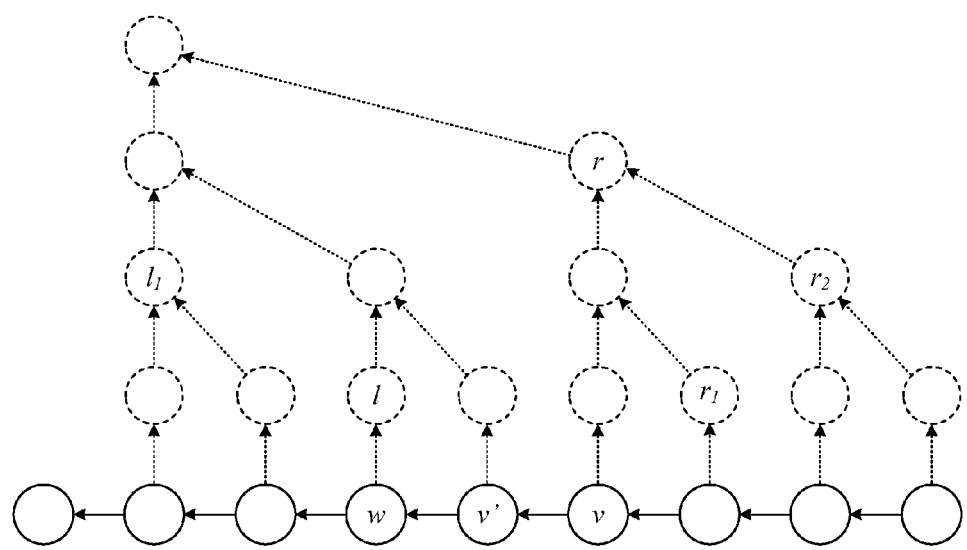
FIG. 5 illustrates a hash sequence traversal that updates the hash chains, proving the leaves to the root of the hash tree.

See FIG. 5. The new traversal procedure extends the hash sequence traversal algorithms (Jakobsson, etc.) in the following way:

- A hash tree structure is added to hash (password) sequence.
- Let the left/right "containing subtree" of a leaf x be the maximum subtree of the hash tree in which x is rightmost/leftmost leaf.
- Let the left/right "cut" of x be all the left/right siblings in the chain from x to the root of the tree. Observe that the left/right cut of x always includes a chain from x to the root of its left/right containing subtree. This mean the left/right cut is sufficient to compute the root hash value of the left/right containing subtree in O(log l) hash computations.
- In this embodiment, for each pebble v in the original scheme, the system may record its right cut ($r_1$, $r_2$ in FIG. 5) and whenever the original routine calls for moving v to the left, for example, to v', the right cut may also be updated based on the observation that the right cut of v' does not include any other nodes except those in the right cut of v and the root of the right containing subtree of v (r in the figure).
- The system additionally records the most recently released leaf node w and its left cut and whenever the original algorithm reveals the right neighbor of w as the left neighbor v' of some pebble v, the right cut of v' can be computed from the right cut of v as usual, but also the left cut of v' from the left cut of w ($l_1$ in the figure) and the root of its left containing subtree (l in the figure) by observations symmetrical to the ones in the previous point.
- The right neighbor of w is then given, along with it left and right cuts and can therefore reveal the chain from it to the root of the tree and also update w and its left cut to match the new most recently release value.

The pebbling procedure that may be used in embodiments of the invention may otherwise proceed as with hash sequence traversal. If Jakobsson's algorithm for placing pebbles is used, there will be O(log l) pebbles. For each one-time password revealed, the system may move some of these pebbles to the left, by (log l) steps in total. Updating the hash tree cuts for each step costs O(log l) hash computations and hence, the computational cost of every new one-time password will be measured by $O(\log^2 l)$, as will be the size of protected memory needed to keep the pebbles and their cuts. For example, if certificates are issued once per year, with SHA-256, and there is one hash value per second, then the size of memory needed will be less than 20 K bytes.

Use of Pseudorandom Functions

Above, the sequence of passwords is generated using repeated application of a cryptographic hash function, with a hash-tree structure included for efficient verification. Keeping the hash-tree structure for the purpose of verification, it would also be possible to generate the one-time passwords using other pseudo-random functions instead, in which case it would also not be necessary to generate the passwords iteratively. (Note that a hash function can be considered a form of pseudo-random function. All such functions—hashing or otherwise—may be collectively referred to as "cryptographic functions") One example of an embodiment that includes such pseudo-random password generation, with reduced storage requirements, may proceed as follows:

A signer picks a random, secret seed s;

For each of a plurality of index values i, such as time, order, etc., $z_i$ is generated by hashing the seed s and the index i: $z_i = h(s, i)$;

The hash tree is computed as previously, and root r is certified.

One advantage of this scheme is that it enables efficient, parallel generation of the keys (and corresponding computation of the hash tree). Note that even other types of functions may be used instead of hash functions and pseudo-random functions, such as encryption functions (symmetric as well as asymmetric) although, for known reasons of security, these functions should be adequately collision-resistant and non-invertible.

Hardware Implementation

For better protecting the keys $z_i$, in one embodiment, the keys are held in a hardware personal signature device 600 (FIG. 1) such as a dongle or other separate device capable of computation and communication such as a smart phone or tablet computer with suitable connectivity to the client's computer, as long as such a device could fulfill the requirements listed below. Alternatively, the personal signature device may be implemented as a software module in a more general hardware device, although this implementation may be less secure, or require additional security features to ensure adequate security.

The personal signature device will include, or at least be able to pass, executable code to a processor and, depending on the implementation, will include any other conventional supporting components and circuitry such as at least some form of active or passive processing circuitry 650, some form of control code 655 (which, in the case of a dongle, may be rudimentary but sufficient, implemented as firmware or fixed in hardware) that controls the operation of the processing system and volatile and/or non-volatile memory or other storage 660. The personal signature device may be connected to the client's computer in any known manner, such as through a USB port (illustrated) or a wireless interface.

To avoid premature disclosure of keys, there should preferably be a mechanism that prevents malware from abusing the personal signature device, that is, from making the device disclose future keys. Two ways to do this include:

Independent time source, such as a hardware clock 656, that is within the signature device 600, or that can transmit a time value to the device, and that cannot be externally adjusted and prevents the use of $z_i$ earlier than $t_0+i(1-\delta)-\Delta$, where $\delta$ is the maximum expected clock drift per time unit and $\Delta$ is the maximum acceptable service delay. The shortcoming of this approach is that ordinary quartz clocks may drift a few seconds per day, such that the yearly drift can be about 10 minutes. More precise clocks might be too expensive for personal signature devices, but may be used in less cost-sensitive implementations.

Secure channel between the server and the signature device that enables the server to securely announce precise time to the signature device, so that there is no need to have a clock in the signature device itself; security of the channel thus prevents an adversary from sending an incorrect time signal and trick the system into believing, for example, that the time is $t_0+i$ when the real time is less, causing early release of $z_i$. One way to implement such a secure channel would be for the device and the server to share a secret key K that is not known to any programs (and hence, also to malware) running in the client's computer. To sign a hash (or other pseudo-random or encryption function) of a message m, the client sends m to the device together with an index i (of the key $z_i$). The device does not reveal $z_i$ directly, but only the request $x=h(m, z_i)$ that will be sent to the signature server. Together with the signature $S_r(x, ID_c)$, the server also sends to the client a Message Authentication Code $MAC_K(t)$. The signature device does not reveal $z_i$ and $C_i$ before having seen a correct $MAC_K(t)$ such that $t_0+i<t$, that is, after $z_i$ has already expired. Assuming that there is no co-operating malware both in the server and in the client's computer, this guarantees that the keys $z_i$ are never prematurely exposed.

In addition to the features listed above, the personal signature hardware device (or software module in a more general hardware device) 600 preferably has as many of the following properties as possible:

- A source of precise time—two options are mentioned above, namely, using either an internal clock or receiving time signals over a reliable channel.
- In response to the input of a request that consists of a hash $m=h(M)$, and index i, the device computes $x=h(m; z_i)$ and outputs x.
- In response to the input of a request that consists of an index i, the device outputs the hash chain $C_i$ from $z_i$ to the root hash r, but not earlier than $t_0+i(1-\delta)-\Delta$, where $\delta$ is the maximum expected clock drift per time unit and $\Delta$ is the maximum service delay; If this condition is not fulfilled, an error message is preferably given that may, for example, contain the number of time units after which the condition is expected to be fulfilled.

There might optionally be a restriction that only a certain number of messages can be signed per time unit. This feature may be included to limit the risk of abusing the signature device if a client's computer is compromised.

The device may have a pre-shared secret authentication key, such as the secret key K, with the server 100 and an activation password known only by the client 200. This means that the signature is created by the server only if the request is properly authenticated by the device, and the device does not create any requests without having entered a correct activation password. Such a signature device, if included, would then guarantee at least the same level of security as currently found in smartcard implementations of traditional digital signature mechanisms like RSA. For creating a signature, the method of the invention described here may typically (as example only) require about one thousand hash operations (assuming the system implements the hash calendar traversal routine described in the previous section), which is close to the requirements of a single RSA decryption.

The service delay $\Delta$ can be determined using known methods in advance for each system configuration, and it can then be fixed, at least for some period, especially if it is to be programmed into several personal signature devices. If the personal signature devices 600 are configured to receive data from client systems 200, then the service delay can be updated in the devices, such as periodically. As a further extension, to "tighten" the gap during which passwords are valid, the personal signature device 600 or the client could periodically "ping" the signature server to determine a current service delay, increase this by some predetermined relative or absolute margin, and then apply that dynamically determined service delay until the next service delay is determined.

Memory Consumption Problem

For signing messages during the next time unit (t+1), the pre-image $z_{t+1}$ of $z_t$ must be found and released. As the hash function $f$ cannot be inverted, the only way is to compute $z_{t+1}$ from any previously saved hash values $z_j$ (the pebbles, if included) with $j>t+1$. Secure memory is a relatively costly resource in hardware devices and therefore even a slight decrease in memory consumption is valuable. Below, an embodiment is disclosed that can reduce the memory consumption.

In embodiments described here, however, the hash sequence has an additional hash tree structure in order to make the verification procedure more efficient (from (l) to (log l) hashing operations), which means that not only the hash values in the sequence must be released but also the verification (authentication) hash chains from particular hashes to a root hash value (which is included into the signer's certificate). As discussed above, using the hash-calendar traversal procedure, with pebbling, requires ($\log^2$ l) units of memory and ($\log^2$ l) time per one pre-image. This means that for the signing key that is valid for one year (that is, $l \approx 2^{25}$ key-hash sequence elements, assuming one-second time resolution), the device needs to store about $25^2=625$ hash values, which, for the SHA-256 hashing algorithm, means about 20 KB of secure memory.

Hierarchical Approach

Figure 6:
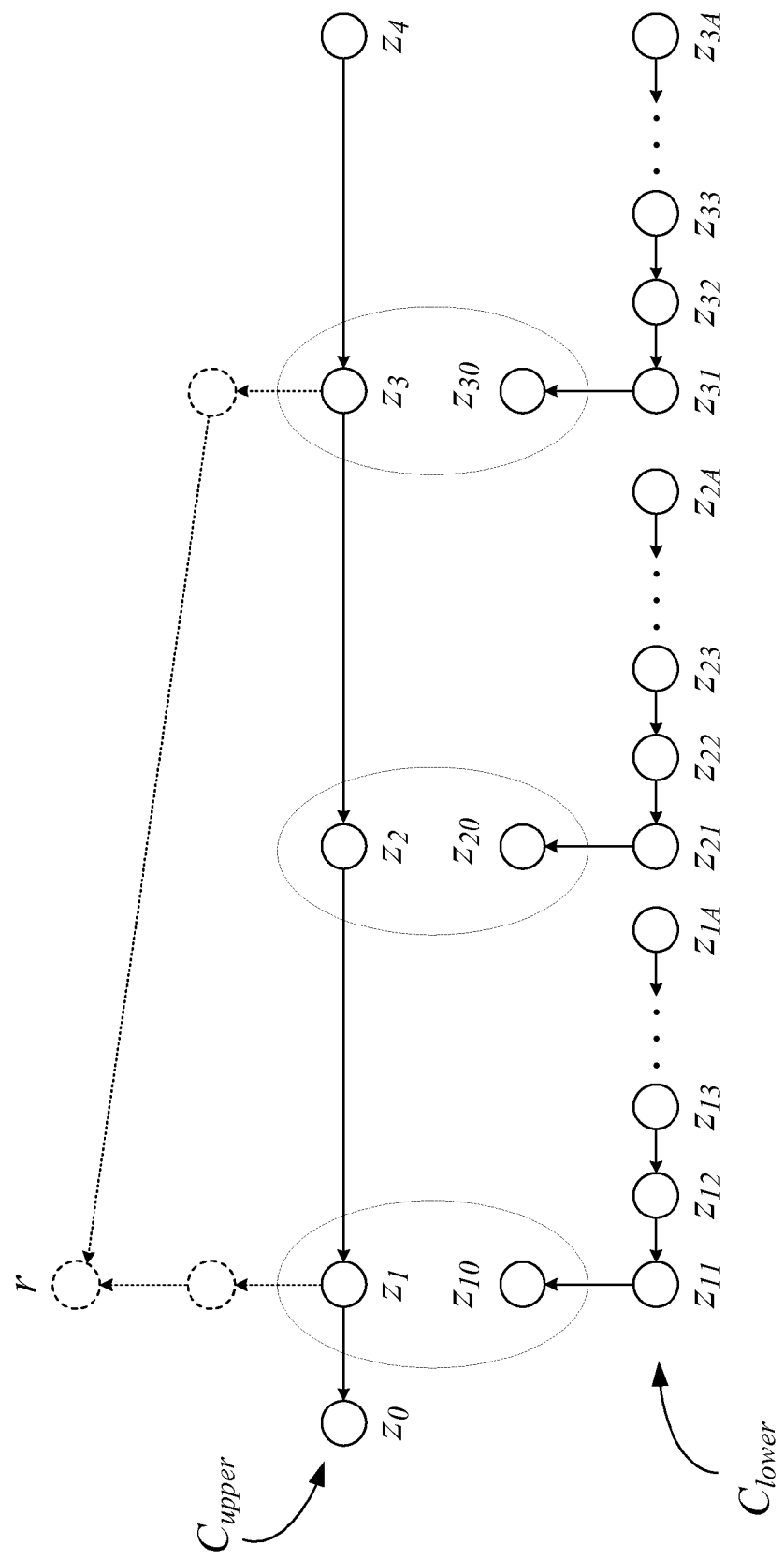
FIG. 6 illustrates a password generation arrangement with both upper and lower hash sequences.

In this section several embodiments are described that reduce memory consumption. The main idea is to use an internal certification hierarchy within the signature device, so that there is a master key (that is, a hash sequence) that is used to certify short-term (for example, about five minutes) signing keys. A signature thus consists of a "short term certificate", which is a hash chain in the master hash tree (used to authenticate $z_t$ in the master hash sequence), and a hash chain that is used to authenticate a particular hash value $z_{ti}$ in the sequence. FIG. 6 illustrates a hierarchical hash sequence embodiment, with a lower hash sequence $C_{lower}$ and an upper hash sequence $C_{upper}$ that is preferably augmented with the hash tree shown in FIG. 4C (but which could also have the structure of the hash tree in FIG. 4A or FIG. 4B instead). In this embodiment, the validity period of t seconds is divided into A-second sub-periods. There are therefore p=l/A such periods. A different password sequence $z_{\alpha 1}, z_{\alpha 2}, \ldots, z_{\alpha A}$ ($\alpha=1, \ldots, p$) is then generated for each period using respective, independently generated random seed values:

$$z_{a1} \xleftarrow{f} z_{a2} \xleftarrow{f} z_{a3} \xleftarrow{f} \cdots \xleftarrow{f} z_{aA}$$

where $z_{\alpha A}$ is a random element in the domain of $f$. Only one period (each comprising a "buffer") is active at any moment of time. For efficiency, at the same time, the next period may be in the phase of key generation. When a period $\alpha$ ends, the next period $\beta=\alpha+1$ is activated by:

- Generating a new A-second password sequence (if it hasn't already been generated during the previous period), substantially as before:

$$z_{\beta 1} \xleftarrow{f} z_{\beta 2} \xleftarrow{f} z_{\beta 3} \xleftarrow{f} \cdots \xleftarrow{f} z_{\beta A}$$

- Signing the last hash value of the new sequence by using the upper or so-called "master" hash sequence $C_{upper}$ of length l/A. Thus, $z_1$ is used to sign $z_{11}$, $z_2$ is used to sign $z_{21}$, $z_3$ is used to sign $z_{31}$, etc., which is indicated by the dashed ellipses surrounding the respective value pairs in FIG. 6.

Buffer without Pipelining

Assume the use of the $\log^2$ pebbling method for both sequences $C_{lower}$ and $C_{upper}$. The memory requirement (the number of stored passwords) can be shown to be about 10 kB for a one-year certificate validity period, a one-second time resolution, and a 256-bit $f$ (that is, 32 output bytes).

Buffer with Pipelining

Assume again the use of the $\log^2$ pebbling algorithm for both sequences. In addition, to avoid delays during the new sequence generation phase, the system may generate the new sequence in parallel with using the current one, which means additional memory buffering of size $\log^2$ A. The memory requirement (the number of stored passwords) can then be shown to be about 13 kB, with the same assumptions as in the previous example Simple Buffer It would be possible to use a lower-level buffer that is relatively short and without the supporting hash tree structure. This solution would thus use the $\log^2$ pebbling algorithm only for the upper sequence $C_{upper}$. The memory requirement (the number of stored passwords) can in that case be shown to be about:

$$\log^2(l/A) = \log^2 A - 2 \log A \cdot \log l + \log^2 l = x^2 - 2\lambda x + \lambda^2$$

where $x = \log A$ and $\lambda = \log l$. In this case, the memory size is smaller the larger A is chosen to be. Hence, one should specify what value of A is reasonable in a given implementation. For example, if one is willing to accept one-second delays and the device used is capable of computing 500 (about $2^9$) hashes per second, then a reasonable choice for A would be $2^9 = 512$. Then for $l \approx 2^{25}$ and $\lambda \approx 25$, and 256-bit $f$, the memory size would be about $(25-9)^2 \cdot 32 \approx 8.2$ KB.

Typical Use Cases of Digital Signatures

To lower the memory requirements, one may use the hierarchical scheme, discussed above, which also solves the irregular usage problem. Every time the client wants to sign a message, the signature device may immediately generate a short-term (for example, five-minute) certificate that can then be used to sign messages with the ordinary BLT-scheme. Note that the time-lists need contain only the times at which the short-term certificates were signed, as there is no need for time lists in the ordinary BLT signature method.

The choice of a suitable configuration of a BLT-signature solution depends on the particular usage scenario. Three different use cases of digital signatures are discussed here by way of example and it is shown that there are suitable solutions for all of them. The example use cases are:

Personal Digital Signatures:

In this case, the signature is typically used not every day and no more than a few times a day, which means that the signature is rarely used more than 500 times a year. Typically, this usage pattern will be irregular and the signature device 600 will mostly not be connected to client's computer 200. In this case, the basic embodiment is not quite suitable and the new solution can help. For example, if assuming the simple buffer scheme described above, with $A=2^9$ (that is, with 8.5-minute certificates), $l=2^{25}$ (one-year validity period), size of a signature is 2 KB, and the device being used 500 times, then the required memory size for the device is about 12 KB (8 KB for pebbles+2 KB for time-lists+2 KB for the stored signature). If the device is capable of computing 500 hashes per second, then the signing time is about two seconds: one second for the generation of a one-time certificate and one second for obtaining a signature from the server.

Employee's Digital Signatures:

In this example, many signatures are created in one day and the signature device is regularly connected to an employee's computer (during every working day). Still there may be long time periods during which there is no connectivity, which is why the basic embodiment is still not quite suitable. Due to the regular connectivity, a hierarchical combination of the new scheme (for the upper sequence) and the original BLT-scheme can be used. The certificates can be relatively long-term (for one day), such that the time-lists will not be large (for example, no more than 365 time values per year), which is about 1.5 KB. If a dual version of the simple buffer scheme (see above) is used with the new scheme (without trees) in the upper sequence and the original BLT-solution in the lower sequence (with trees) and choose $A=2^{16}$, then the memory consumption is about 11.5 KB (8 KB for pebbles+1.5 KB for time-lists+2 KB for the stored signature). For devices capable of computing 500 hashes per second, short-term keys may be generated in 1-2 minutes, which is not a problem as may be done just once in the beginning of the working day.

Device Signatures:

In this example, signatures are created automatically by a computer and the signature device is constantly connected to the computer. In this case, the original BLT-solution or the buffer with pipelining solution (see above) with memory consumption about 13 KB can be used.

Irregular Usage Problem

The solutions above are most efficient if the signature device is constantly powered and running. This is a reasonable assumption in case of device signatures such as client servers that frequently request and use signatures, but not necessarily in the case of personal signatures—personal signature devices are typically not used very often, and so most of the one-time passwords in the sequence will never be used.

Even accepting that, two problems still remain. First, most hash sequence traversal solutions are not intended for irregular usage patterns and may become inefficient if there is a need to catch up. The time needed for catching up is O(l). Secondly, the Certificate Authority signatures must be created at the seconds intended for that. These seconds are $t_0+i \cdot \Delta$, where A is the length of the sub-period in seconds. If the validity of the certificates is, as one example, 10 minutes (that is, $A=600$), and the signature device is connected to the client's computer right after $t_0+i \cdot A$, then for about 10 minutes, there would be no valid certificates for signing, and the client would not be able to sign for almost 10 minutes.

New Hash Sequence Signature Scheme

To overcome the irregular usage problem, in one embodiment, there is no predetermined schedule for using the one-time passwords $z_i$ that is, $z_i$ is used to sign i-th message and there is no direct relationship between i and the current time. The challenge is ensuring that $z_i$ will not be abused by third parties (to sign more messages) after having been made public. To this end, in this embodiment, the signatures themselves are used as (server-signed) revocation notes of $z_i$: the signature request also contains the index i of $z_i$, which is included into the signature. The server is not allowed to sign two messages with the same index. In case it uses $z_i$ (possibly co-operating with a malicious adversary) twice, the client is thus able to prove the forgery by showing the original (older) signature with $z_i$.

The main advantage of this scheme is that clients can use the one-time passwords whenever they want to. A signature counter mechanism on the server side may then prevent malicious verifiers (third parties that verify signatures) from abusing the already-used passwords. Even if a malicious verifier co-operates with a malicious server, clients will still capable of defending themselves with the list of already created signatures or the re-confirmed time-lists (see below).

Key Generation

In this embodiment, the client generates a random seed $z_l$ and a key-hash sequence $z_1, z_2, z_l$ by using the relationship $z_{i-1}=f(z_i)$ (for all i=1 . . . 1). This is as in the embodiments described above. Every hash value is then a one-time password. The client also computes the key hash-tree and its root hash r, again as above. The client's public key consists of $z_0=f(z_1)$ and r.

Public Key Certificates

A public key certificate for client contains the identity $ID_c$ of the client, the public key $(z_0, r)$, the validity period $t_0 \ldots t_1$, and the identity $ID_s$ and connection parameters of the signature server that is authorized to serve the client. The certificate is sent to the signature server and is also published in a way that is not controlled by the signature server, that is, the server cannot create or change clients' certificates. To revoke the certificate, it is sufficient to send the server a revocation note.

Signing a Document

Assume that there is a shared secret authentication key between the server and the client. This key may then be used to authenticate the messages sent between them. For every client, the server may also store the number of signatures already created by this client. To sign the i-th message m (or a hash of a message):

The client (with identity $ID_c$) computes $x=h(m, z_i)$ and sends $(x, ID_c, i)$ as a request to the signature server.

The server checks that i is consistent with the stored signature count and that the certificate of the client has not been revoked.

If the checks were successful, the server obtains a time-stamp $S_t(x, ID_c, i)$ for $(x, ID_c$, and sends $S_t(x, ID_c, i)$ back to the client.

The client stores all the signatures $S_{t1}(x_1, ID_c, 1), S_{t2}(x_2, ID_c, 2), \ldots$ he ever creates. This is necessary for later disputes where the client has to deny forgeries created by a malicious server.

The signature for m is $\Sigma=\langle D_c, i, S_t\rangle$, where $c_i$ is the tree hash chain which proves that $z_i$ is the i-th element of the key hash sequence.

Verifying a Signature

To verify a signature $\Sigma=\langle ID_c, i, z_i, c_i, S_t\rangle$ with a certificate $\langle ID_c, z_0, r, t_0, t_1, ID_s\rangle$ the following is checked:

Client identities in the certificate and in the signature coincide.

The key $z_i$ and the hash chain $c_i$ lead to the root hash value r, that is, the correct key was used.

$S_t$ is a valid time-stamp on $(h(m, z_i), ID_c, i)$

Server identities in $S_t$ and the certificate coincide, that is, the server was authorized by the client to create the signature.

Denying a Forgery

Dishonest third parties in co-operation with the signature server may try to abuse the one-time keys $z_i$ that are already used and public. Let $S_t(x', ID_c, i)$ (where $x'=h(m', z_i)$ is a new signature created with $z_i$ at time t'>t.

The client can in that case show the stored signature $S_t(x, ID_c, i)$ and prove thereby that $S_{t'}(x', ID_c, i)$ is a server-assisted forgery. The service provider is then fully responsible for the consequences.

In this solution, the client should store all the signatures that have been created. For later availability of the signatures, it is desirable to store the signatures inside the signature device or to any other medium that is not controlled by the signature server. Note that the memory in which the signatures are held need not be secret, in which case the price of storing the signatures may be acceptable.

Storing Time-Lists Instead of Signatures

To save storage, the scheme can be modified by using hashed time-lists. For example, instead of storing two signatures $S_{t1}(x_1, ID_c, 1), S_{t2}(x_2, ID_c, 2)$, the client may store only the second one, assuming the server 500 signs $(t_1, x_2, ID_c, 2)$ at $t_2$ to confirm that the previous signature was created (and the previous password $z_1$ revoked) at $t_1$. To develop this idea further, assume that (when signing the i-th message $m_i$), the server signs $(y_{i-1}, x_i, ID_c, i)$, where $y_{i-1}$ is the incremental hash of the time-list $t_i, t_2, \ldots, t_{i-1}$ computed by the recurrent scheme $y_j=h(y_{j-1}, t_j)$, $y_0=\emptyset$, where $\emptyset$ indicates a "nul" or "empty" or other "initial" value. After creating the signature $S_{ti}(y_{i-1}, x_i, ID_c, i)$, the server computes $y_i=h(y_{i-1}, t_i)$ and stores $y_i$. The previous value $y_{i-1}$ is no longer needed.

The client has to store the time-list $t_1, t_2, \ldots, t_{i-1}$ and the last signature $S_{ti}(y_{i-1}, x_i, ID_c, i)$, which indirectly confirms that $z_1, z_2, \ldots, z_{i-1}$, were revoked at $t_1, t_2, \ldots, t_{i-1}$, respectively. If the size of the signature is 3 KB, the time values are 32-bit integers, and the client generates 500 signatures, then the storage required on the client side for the time-list and the signature can be shown to be about 5 KB.

A modification of this scheme may be that the server 500 is made responsible for storing the time-list $t_1, t_2, \ldots, t_{i-1}$ while the client only stores and updates the hash of the list and keeps only the last signature. It may be presumed that once the server signed $(y_{i-1}, x_i, ID_c, i)$, it must be able to present a time list with i−1 elements that hashes to $y_{i-1}$. This further reduces the memory requirements on the client side.

Hash Tree

Figure 7:
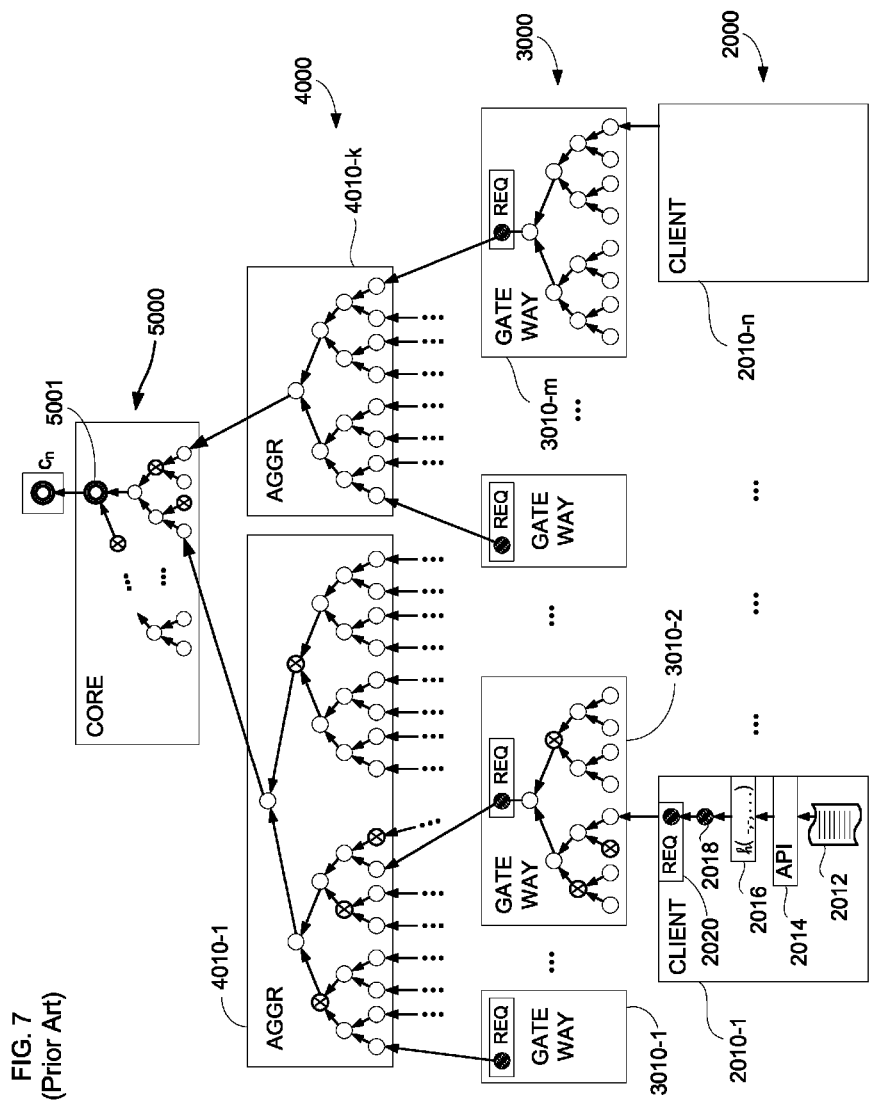
FIG. 7 illustrates various layers of a generalized digital record verification and signing infrastructure.

FIG. 7 illustrates the hash tree infrastructure (the "Guardtime signing infrastructure") illustrated in, which has been developed by Guardtime As of Tallinn, Estonia, and which is disclosed in U.S. Pat. Nos. 8,347,372, 8,312,528 and 7,698,557 (all Buldas, et al., "System and method for generating a digital certificate") as well as U.S. Pat. No. 8,719,576 (also Buldas, et al., "Document verification with distributed calendar infrastructure"). In short, the hash tree infrastructure of Buldas '576 may be used to function not only as the time-stamping system 500, but also, optionally, to sign other information from the client 200 and/or server 500 and/or the signature device 600 as well. This Guardtime signing infrastructure may optionally be used to create the signatures I, and/or to compute the r value given a set of passwords $z_i$ by replacing r with a digital signature for the set of passwords (or any subset thereof) that have been used up to the current time. Just for the sake of completeness, the main features of the Guardtime signing infrastructure are summarized here, with reference to FIG. 7.

The general infrastructure has several different layers: a client layer 2000 comprising a number of client systems; a layer of gateways 3000; a layer including one or more aggregation systems 4000; and an uppermost layer 5000 that includes a "core". Typically, the gateways, aggregators and the core will be servers, with known network connections and network communication hardware and software. The client systems may also be servers, but, depending on the implementation, some or all may also be more individualized workstations, laptop, personal or other mobile computing devices, etc. Although FIG. 7 shows the various layers as being separate and distinct, some implementations of the main principles of the infrastructure might consolidate or do without some of the layers or might need to add additional layers for administrative or other purposes.

In the illustrated arrangement, a client is the system where digital records are prepared and entered into the verification/signature system. A digital record may be any set of binary data that one later wishes to verify has not changed since initial registration and signing using the infrastructure. In the context of the various embodiments of the invention, one or more of the passwords zi may be submitted as the digital records to receive signatures, in which case the signature may be used as the r value. A client 2000 may be any system where a representation of any type of information is input, created or otherwise presented (with or without human involvement) in digital form such that it can be processed and registered using the infrastructure according to the invention; in the context of this invention, the client 200 may be one of the client systems 2000.

A gateway in the layer 3000 will typically be a computer system such as a server with which one or more of the clients communicates so as to receive requests for registration of digital records that its clients submit. An aggregator in the aggregation layer 4000 will similarly be a computer system such as a server intended to receive registration requests that have been consolidated by respective gateways. The distinction between aggregators and gateways will often depend on which entities control each, but this is not necessary and in some implementations there is no control or functional differences between the two types of systems.

In FIG. 7, various clients are represented as 2010-1, . . . , 2010-n; gateways are represented as 3010-1, 3010-2, . . . , 3010-m; and two aggregators are shown as 4010-1, 4010-k. An aggregator will typically communicate into each of the lowest level hash tree nodes within the core, as described in more detail below. Only two aggregators are shown in FIG. 7 for the sake of simplicity.

Each client system 2000 that wishes to use the verification infrastructure may be loaded with a software package or internal system routines for convenient or even automatic communication and submission "upwards" of digital information. In the context of this invention, in which the client system 2000 may be the client 200, the digital information may be one or more passwords $z_i$, the value r, or both. The software package may include some application program interface (API) 2014 that transforms submitted digital records into a proper form for processing. A digital record 2012 is then submitted by way of the API 2014 to a software module 2016 that uses the digital data from the record 2012 as at least one argument in a transformation function such as a hash function.

The data structure of a binary hash tree is illustrated within the gateway 3010-2. The lowest level nodes of the gateway hash tree will correspond to the transformed dataset 2018 submitted as a request REQ from a client, along with any other parameters or data used in any given implementation to form a request. As illustrated, the values represented by each pair of nodes in the data structure form inputs to a parent node, which then computes a combined output value, for example, as a hash of the two input values from its "children" nodes. Each thus combined output/hash value is then submitted "upward" as one of two inputs to a "grandparent" node, which in turn computes a combined output/hash value for these two inputs, and so on, until a single combined output/hash value is computed for the top node in the gateway.

Aggregators such as the system 4010-1 similarly include computation modules that compute combined output values for each node of a hash tree data structure. As in the gateways, the value computed for each node in the aggregator's data structure uses its two "children" nodes as inputs. Each aggregator will therefore ultimately compute an uppermost combined output value—a "root hash value"—as the result of application of a hash function that includes information derived from the digital input record(s) of every client that submitted a request to a gateway in the data structure under that aggregator.

In many cases, the core 5000 is maintained and controlled by the overall system administrator. Within the core, a hash tree data structure is computed using the root hash values of the aggregators as lowest level inputs. In effect, the hash computations and structure within the core form an aggregation of aggregation values. The core will therefore ultimately compute a single current uppermost core hash value at the respective tree node 5001 at each calendar time interval t0, t1, . . . , tn. This uppermost value is referred to herein alternatively as the "calendar value" $c_n$ or "current calendar value" for the time interval ti. If calendar values are computed according to precisely determined time values, such as one calendar value each 1.0 s, then each calendar value will also be a precise representation of time.

Note that the uppermost tree node 5001 represents the root node of the entire tree structure of nodes junior to it. This will change upon recomputation of a new uppermost core hash value at the end of the next period of accumulating requests and generating signature vectors (also referred to as "data signatures") containing recomputation parameters. In one configuration of the Guardtime signature infrastructure, the core system 5000 combines the sequence of calendar values cn using a Merkle hash tree to form a combined uppermost hash value, which will encode information from every calendar value, and thus every digital input record, ever submitted to the infrastructure for signature. Periodically, the combined uppermost hash value may then be published in some substantially unalterable medium, such as a newspaper, publicly accessible database or web site, etc., such that, once the value is published, it would be practically impossible to fraudulently alter what was published; for example, it would in practice be impossible to retrieve and change every copy of a newspaper that has been distributed to the public.

In FIG. 7, certain ones of the hash tree nodes in the gateway 3010-2, the aggregator 4010-1, and the core 5000 are marked with an "X". Notice if one traverses the various tree paths upward from the value 2018 in the client 2010-1, it is possible to compute every value upward in the tree structures all the way to the most current uppermost core value 5001 given the values in the X-marked tree nodes (the "siblings" of the nodes in the direct recomputation path) and a knowledge of the hash functions applied at each successive parent node. In short, if a signature is associated with the digital record 2012 that includes all of the "X-marked" values, and assuming predetermined hash functions, then re-computation of the hash values upward through all of the tree structures will yield the same value as in the current calendar value, but only if the starting input value representing the original digital record is in fact identical in every respect to the original. Even the slightest alteration to the digital input record or even a change of a single bit in any of the values of the signature associated with a record 2012 will lead to a re-computed calendar value that is not identical to the one in node 5001. Note also that each uppermost computed value in the core—the current calendar value—contains information derived from every digital input record that is input into the system during the current calendar time interval.

The set of sibling hash values, along with any other information such as order (such as "left"/"right", since most cryptographic hash functions are not commutative, that enable recomputation of the corresponding calendar value, may then be returned to the client system as the signature for the digital input. This signature may later be extended with the sibling values within the core's Merkle hash tree that allow recomputation all the way up through the infrastructure to the uppermost hash value of the core 5000.

Assume now by way of example that some entity later wishes to verify that a digital record in question—a "candidate digital record"—is an identical copy of digital record 2012. Applying the same transformation function 2016 to the candidate digital record and recomputing upward using the corresponding data signature, the entity should compute to the exact same calendar value that resulted from the original digital record's request.

Implementation of Methods

The various computational and interfacing software modules/components (220, 270, 272, 274; 520; etc.) within the client 200, the signature server 500 and, if included, the signature device 600, will typically be embodied as processor-executable code stored in memory/storage devices 260, 560, 660, such as RAM, flash memory, disks, etc., some or all of which may be local and/or remote (in the "cloud"), may be volatile and/or non-volatile, and will generally be non-transitory. Each server or system component, such as the signature device 600 (if included), will, accordingly, have either one or more processors 250, 550, 650, as well as some form of system software, such as an operating system or other similar code 255, 555, 655 to submit the processor-executable code to the respective processor(s). To provide timing, the client will preferably include or be connected to some form of clock circuit 256; the signature server will typically similarly have some access to clock circuitry 556, and, depending on the implementation, the signature device may also include such clock circuitry 656.

The invention claimed is:

1. A method for signing a digital message, comprising:
computing a password sequence comprising a plurality of passwords such that each respective password corresponds to an index unit;
receiving the message;
submitting a current request to a signature server, said current request being computed as a first function of the message and a current one of the passwords; and
if the request is approved, receiving from the signature server a current time-stamp for the current request and forming a signature for the message to include at least the current time-stamp;
further comprising:
computing each of the plurality of passwords as a second function of a respective subsequent password, said sequence terminating with an initial password that forms a first public key verification parameter for the password sequence;
computing for the password sequence a verification hash tree comprising a plurality of leaf nodes and a single root node, such that the lowest-level leaf nodes include at least a subset of the passwords of the sequence in order, each node above the lowest-level nodes being computed as a hash of the values of two immediately lower-level nodes, and the uppermost node being the root node, which has a root hash value that forms a second public key verification parameter for the password sequence.

2. The method of claim 1, in which the second function is a cryptographic hash function.

3. The method of claim 1, further comprising computing each of the plurality of passwords as a pseudo-random function including, as at least one input parameter, a respective one of the index units.

4. The method of claim 3, in which the pseudo-random function is a cryptographic hash function.

5. The method of claim 3, in which the pseudo-random function is an encryption function.

6. The method of claim 1, in which the current password is verified only if its position in the password sequence correctly corresponds to the index unit during which the current request is submitted, whereby the signature for the message is valid and verifiable only if the corresponding password used in the computation of the current request is verified.

7. The method of claim 6, further comprising revealing the current password only after verifying the corresponding signature, whereby the subsequent password in the password sequence is set as the current password for a subsequent request.

8. The method of claim 7, further comprising estimating a response delay from the signature server and adjusting a validity time of the current password as a function of the estimated response delay.

9. The method of claim 1, in which the current password is valid if, used as input to a lowest level node of the verification hash tree, and given sibling node values in the verification hash tree, re-computes upward through the verification hash tree to the root hash value.

10. The method of claim 1, in which:
each of the plurality of passwords is computed as a function of the subsequent password; and
the current password is valid if, as determined by backwards computation of the password sequence, it is in the correct index order relative to one of the subset of passwords in the password sequence that, used as input to a lowest level node of the verification hash tree, and given sibling node values in the verification hash tree, re-computes upward through the verification hash tree to the root hash value.

11. The method of claim 1, further comprising:
generating a public key certificate including a client ID, identifying a client entity that submits the request, and a server ID, identifying a signature server authorized to receive requests from the client entity;
along with the request, including the client ID; and
whereby the time stamp is received only if the public key certificate has not been revoked for the client entity identified by the client ID.

12. The method of claim 11, in which the signature further includes at least two of the values chosen from the group consisting of: the client ID, a position indicator indicating the position of the current password in the password sequence, the current password, re-computation parameters enabling re-computation of the root hash value from the current password, and the time-stamp.

13. The method of claim 1, in which the index units are non-temporal.

14. The method of claim 1, in which the index units are time units.

15. The method of claim 1, in which the current password, after the signature is formed, forms a self-revocation notice to the signature server such that the current password can no longer be used to request another signature.

16. The method of claim 1, further comprising:
dividing the password sequence into a plurality of validity time periods;
for each time period, generating a respective secondary password sequence; and
signing a public key parameter of each secondary password sequence using a respective one of the passwords in the password sequence.

17. The method of claim 16, further comprising generating the respective secondary password in the sequence by applying a hash function recursively backwards from a respective final secondary password value until reaching an initial secondary password value.

18. The method of claim 1, further comprising:
for each of a plurality of the passwords in the password sequence, computing a secondary password sequence such that each secondary password in the sequence is computed as a hash of a subsequent secondary password, each secondary password sequence terminating with an initial secondary password; and
signing each initial secondary password with a respective one of the passwords in the password sequence.

19. The method of claim 1, further comprising forming the signature by:
creating a digital input record including the message and current password;
submitting the digital record as part of a request for digital signature to a hash tree-based, keyless signature infrastructure; and
receiving from the signature infrastructure a digital signature for the digital record;
in which the digital signature encodes a signature time; and
in which a purported copy of the digital record is identical to the digital record only if iterative, pairwise hashing of the purported copy with sibling hash values within the digital signature leads to recomputation of a calendar value for a calendar period in which the digital signature was created, said calendar value being an uppermost current hash value of the hash tree-based, keyless signature infrastructure.

20. The method of claim 1, further comprising:
submitting the message from a client server to a signature device (600) along with a corresponding index unit value; and
receiving the request back to the client server from the signature device;
said passwords being computed within the signature device, whereby the passwords remain unknown to the client server.

21. The method of claim 1, further comprising receiving from the signature device a hash chain corresponding to a hash tree computation path from at least a subset of the passwords to a verifying root value, said subset of passwords including previously used passwords and a current password, but only within a predetermined period relative to the submitted index unit value.

22. A system for signing a digital message, comprising:
a processor;
a memory;
a password module comprising computer-executable code including instructions which, upon execution by the processor, cause the processor
to compute a password sequence comprising a plurality of passwords such that each respective password corresponds to an index unit;
to compute each of the plurality of passwords as a second function of a respective subsequent password, said sequence terminating with an initial password that forms a first public key parameter for the password sequence;
and
to compute a current request as a first function of a message and a current one of the passwords;
a certificate software module comprising computer-executable code including instructions which, upon execution by the processor, cause the processor to submit the current request to a signature server and, if the request is approved, to receive from the signature server a current time-stamp for the current request and forming a signature for the message to include at least the current time-stamp;
a hash tree module comprising computer-executable code including instructions which, upon execution by the processor, cause the processor to compute for the password sequence a verification hash tree comprising a plurality of leaf nodes and a single root node, such that the lowest-level leaf nodes include at least a subset of the passwords of the sequence in order, each node above the lowest-level nodes being computed as a hash of the values of two immediately lower-level nodes, and the uppermost node being the root node, which has a root hash value that forms a second public key parameter for the password sequence.

23. The system of claim 22, in which the second function is a cryptographic hash function.

24. The system of claim 22, in which the password module includes instructions causing the processor to compute each of the plurality of passwords as a pseudo-random function including, as at least one input parameter, a respective one of the index units.

25. The system of claim 24, in which the pseudo-random function is a cryptographic hash function.

26. The system of claim 24, in which the pseudo-random function is an encryption function.

27. The system of claim 22, further comprising a verification module comprising computer-executable code including instructions which, upon execution by the processor, cause the processor to indicate that the current password is verified only if its position in the password sequence correctly corresponds to the index unit during which the current request is submitted, whereby the signature for the message is valid and verifiable only if the corresponding password used in the computation of the current request is verified.

28. The system of claim 27, in which the current password is revealed only after verifying the corresponding signature, whereby the subsequent password in the password sequence is set as the current password for a subsequent request.

29. The system of claim 28, further comprising estimating a response delay from the signature server and adjusting a validity time of the current password as a function of the estimated response delay.

30. The system of claim 22, in which the current password is valid if, used as input to a lowest level node of the verification hash tree, and given sibling node values in the verification hash tree, re-computes upward through the verification hash tree to the root hash value.

31. The system of claim 22, in which
each of the plurality of passwords is computed as a function of the subsequent password; and
the current password is valid if, as determined by backwards computation of the password sequence, it is in the correct index order relative to one of the subset of passwords in the password sequence that, used as input to a lowest level node of the verification hash tree, and given sibling node values in the verification hash tree, re-computes upward through the verification hash tree to the root hash value.

32. The system of claim 22, in which the password module is further configured to generate a public key certificate including a client ID, identifying a client entity that submits the request, and a server ID, identifying a signature server authorized to receive requests from the client entity; and
to include the client ID along with the request; and
whereby the time stamp is received only if the public key certificate has not been revoked for a client entity identified by the client ID.

33. The system of claim 32, in which the signature module is provided to include, in the signature, at least two of the values chosen from the group consisting of: the client ID, a position indicator indicating the position of the current password in the password sequence, the current password, re-computation parameters enabling re-computation of the root hash value from the current password, and the timestamp.

34. The system of claim 22, in which the index units are non-temporal.

35. The system of claim 22, in which the index units are time units.

36. The system of claim 22, in which the current password, after the signature is formed, forms a self-revocation notice to the signature server such that the current password can no longer be used to request another signature.

37. The system of claim 22, in which:
the password sequence is divided into a plurality of validity time periods;
for each time period, a respective secondary password sequence is generated; and
a public key parameter of each secondary password sequence is signed using a respective one of the passwords in the password sequence.

38. The system of claim 37, in which the respective secondary password in the sequence is generated by applying a hash function recursively backwards from a respective final secondary password value until reaching an initial secondary password value.

39. A password generation system comprising:
a client server that includes a processor and a non-volatile memory, said client server communicating with a signature device and a signature server;
said client server being configured
to receive a message,
to submit the message along with an index value to the signature device;
to receive the request back from the signature device, said request being computed as a cryptographic function of the message and a password corresponding to the index value;
said password further being computed as a function of a subsequent, password in a sequence, said sequence terminating with an initial password that forms a first public key parameter for the password sequence; and
to submit the request to the signature server and, if the request is approved, to receive from the signature server a current time-stamp for the current request and to a signature for the message to include at least the current time-stamp;
in which the client server is synchronized with the signature device to within a predetermined margin, said client server receiving from the signature device a hash chain corresponding to a hash tree computation path from at least a subset of the passwords to a verifying root value, said subset of passwords including previously used passwords and a current password, but only within a predetermined period relative to the submitted index value.

* * * * *